(12) United States Patent
Aoki et al.

(10) Patent No.: US 6,343,683 B1
(45) Date of Patent: Feb. 5, 2002

(54) CLUTCH-RELEASE BEARING UNIT

(75) Inventors: Shuhei Aoki; Masao Takeda, both of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/559,322

(22) Filed: Apr. 27, 2000

(30) Foreign Application Priority Data

Apr. 28, 1999 (JP) .......................................... 11-121160

(51) Int. Cl.$^7$ .............................................. F16D 23/14
(52) U.S. Cl. ........................... 192/98; 192/110; 192/13
(58) Field of Search ................................ 384/909, 908, 384/612, 42; 192/98, 110 B

(56) References Cited

U.S. PATENT DOCUMENTS

| 4,228,881 A | * | 10/1980 | Nakamura | ................... | 192/98 |
| 4,563,495 A | | 1/1986 | Kawaguchi et al. | ........ | 524/413 |
| 4,742,902 A | | 5/1988 | Leigh-Monstevens et al. | ... | 192/98 |
| 4,787,991 A | | 11/1988 | Morozumi et al. | ........ | 252/12.4 |
| 5,506,056 A | * | 4/1996 | Yoshihara | ............... | 384/908 X |

FOREIGN PATENT DOCUMENTS

| EP | 148743 A2 | * | 7/1985 |
| FR | 2 667 074 | | 3/1992 |
| FR | 2 726 057 | | 4/1996 |
| JP | 60-3331 | | 1/1985 |
| JP | 6-73468 | | 10/1994 |
| JP | 8-157714 | | 6/1996 |
| JP | 9-177827 | | 7/1997 |

* cited by examiner

Primary Examiner—Charles A. Marmor
Assistant Examiner—Saúl Rodríguez
(74) Attorney, Agent, or Firm—Crowell & Moring LLP

(57) ABSTRACT

A sleeve 2 is made from a composition of polyamnide resin and denatured, high-density polyethylene, wherein the polyethylene is denatured with unsaturated dicenboxylic acid or unsaturated dicarboxylic acid anhydride or both to have a molecular weight of 50,000 to 400,000 in average.

5 Claims, 3 Drawing Sheets

CLUTCH-RELEASE BEARING UNIT

FIELD OF THE INVENTION

The clutch-release bearing unit of this invention is installed in the clutch mechanism of a manual transmission or gear changer for an automobile, and is used for pushing the center of a diaphragm spring when changing gears with a push-type clutch, and is used for pulling the center of a diaphragm spring when changing gears with a pull-type clutch.

DESCRIPTION OF THE PRIOR ART

The clutch mechanism of the manual transmission or gear-changer comprises a flywheel that rotates together with the engine's crankshaft, a clutch disk that faces the flywheel, a pressure plate that pushes the clutch disk toward the flywheel, a diaphragm spring that pushes the pressure plate toward the clutch disk, and a clutch-release bearing unit that moves freely along a guide shaft (front cover) that is located around the power-transmission shaft and changes the angle of inclination of the diaphragm spring as it moves in order to control the disengagement and engagement between the flywheel and the clutch disk.

Conventionally, for this kind of clutch mechanism there is the so-called push type that pushes the center of a diaphragm spring when disengaging the clutch (when separating the flywheel and clutch disk so that the rotating force of the crank shaft is not transmitted to the transmission by way of the aforementioned shaft), and a so-called pull type that pulls the center of the diaphragm spring when disengaging the clutch.

In either case of clutch mechanism, when disengaging the clutch, the aforementioned clutch-release bearing unit is displaced along the axial direction by the release fork which rocks when the clutch pedal is stepped on. In addition, by attaching one of the races of the release bearing of this clutch-release bearing unit to the center of the diaphragm spring directly or by way of some other member, it pushes or pulls the center of the diaphragm spring. In this condition, the aforementioned release bearing unit prevents the parts from rubbing against each other due to the relative rotation of the aforementioned race and the other race regardless of the rotation of the diaphragm spring.

FIGS. 1 and 2 show an example of a clutch-release bearing unit as disclosed in Japanese Patent Publication Toku Kai Hei 9-177827 to be installed in this kind of clutch mechanism. This clutch-release bearing unit 1 is installed in a push-type clutch mechanism and comprises a non-rotating sleeve 2 that slidingly moves freely along a cylindrical-shaped, non-rotating guide shaft 21 (front cover) that is installed in this clutch mechanism. The sleeve 2 is totally made of a synthetic resin, easily slidable, and formed in a cylindrical shape.

In addition, there is a ring-shaped flange 3 that is formed around the outer peripheral surface of the sleeve 2. In the example shown in the figure, this flange 3 is made out of the same synthetic resin as the sleeve 2, and is integrated in one piece with the sleeve 2. This flange 3 may also be made of metal, as disclosed in Japanese Patent Utility Model Publication Jitsu Kai Hei 6-73468, and the inner peripheral edge may be inserted in the sleeve 2 when forming the sleeve 2.

A release bearing 4 is supported by the surface on one side (left side in FIG. 1) of the flange 3. This release bearing 4 comprises an outer race 6 with an outer-race track 5 formed around its inner peripheral surface, an inner race 8 with an inner-race track 7 formed around its outer peripheral surface, and a plurality of rolling bodies (balls) 9 rotatably located between the outer-race track 5 and the inner-race track 7. In the example shown in the figure, the outer-race track 5 has a deep groove type, and the inner-race track 7 has an angular type. This release bearing 4 supports a radial load, as well as a thrust load in the direction of one side of the flange 3 (toward the right side in FIG. 1). This kind of release bearing 4 is supported on the surface on the one side of the flange 3 by retaining springs 10, that are fastened at two locations on the flange 3 opposite from each other in the radial direction (top and bottom in FIG. 2), such that it can displace a little in the radial direction (such that it can automatically center itself with respect to the diaphragm spring).

In the example in the figure, of the outer race 6 and the inner race 8 of the release bearing 4, the inner race 8 is formed by pressing a steel plate. By performing this kind of plastic processing based on pressing a steel plate, the inner-race track 7 is formed around the outer peripheral surface of the middle section of this inner race 8, a radially inward facing edge 11 is formed around its base end (right end in FIG. 1), and a curved section 12 is formed on the opposite end (left end in FIG. 1) by bending it outward in the radial direction in order to come into contact with the center of the diaphragm spring (not shown) for pressing.

Moreover, a metal slide plate 13, called an anvil, is attached to the surface on the other side of the flange 3 (right surface in FIG. 1), and it prevents friction with the flange 3, regardless of the sliding motion with the tip of the release fork (not shown).

Also, at two locations opposite each other in the radial direction on the outer peripheral edge of the surface on the other side of this flange 3, guide walls 14 for guiding the ends of the release fork are formed such that they are parallel with each other. Part of the retaining springs 10 pass through a hole 16 formed in both of these guide walls 14. Moreover, reinforcement ribs 15 are formed at a plurality of locations between the surface on the other side of the flange 3 and the outer peripheral surface of the sleeve 2, for maintaining strength against the thrust load that is applied to the flange 3 from the release bearing 4. Furthermore, the outer peripheral edge of seal rings 17a, 17b are fastened around the inner peripheral surface on both ends in the axial direction of the outer race 6 to seal both of the openings of the space where the rolling bodies 9 are located.

In the clutch-release bearing unit described above, it is desired that the synthetic resin sleeve 2, located such that it slides freely with respect to the guide shaft 21, has good capability of sliding with respect to the guide shaft 21, and that the sliding section has sufficient resistance to wear due to sliding between the sleeve 2 and the guide shaft 21 (especially in the case of an aluminum alloy). In addition to this, it is desired that these characteristics can be maintained over a long period of time.

However, in the case of the synthetic resin sleeve 2 used up until now, it was difficult to sufficiently satisfy these requests. In other words, up until plastic reinforced with glass fiber, such as polyamide 66 mixed with glass fiber, was used as the synthetic resin material for the sleeve 2, however in the case of this kind of glass-reinforced plastic sleeve 2, it was possible to maintain sufficient strength. On the other hand, it was difficult to maintain the desired ability to slide and the desired resistance to abrasion wear over a long period of time.

SUMMARY OF THE INVENTION

An objective of this invention is to provide a clutch-release bearing unit with the above problems in mind.

Another objective of this invention is to provide a clutch-release bearing unit wherein it is possible to improve the sliding capability of the sleeve with respect to the guide shaft as well as its resistance to abrasion wear over a long period of time.

DETAILED DESCRIPTION OF THE PREFERRED EMBODIMENTS

Figure 1:
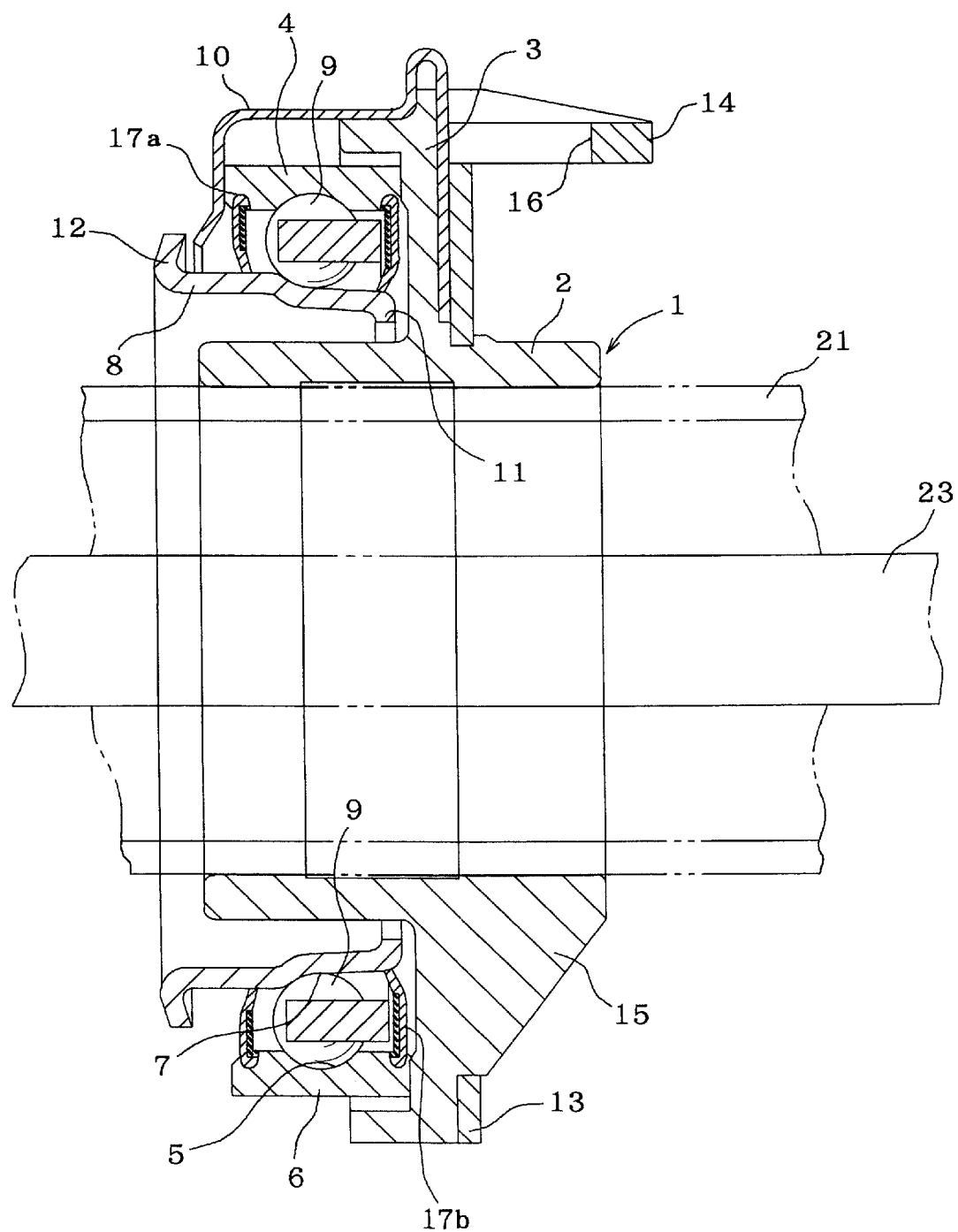
FIG. 1 is a cross sectional view taken along the line I—I in FIG. 2 to show a prior art clutch-release bearing unit to which the present invention is applied.

The clutch-release bearing unit of this invention, similar to as in the prior clutch-release bearing unit described above, comprises a cylindrical sleeve that slides freely along a guide shaft, a circular flange that is formed around the outer peripheral surface of this sleeve, and a release bearing that is supported by the surface on one side of the flange.

Particularly, in the case of the clutch-release bearing unit in a first feature of this invention, the sleeve is made from a composition of polyamide resin and denatured or modified, high-density polyethylene.

In the composition of the sleeve, it is possible to use nylon resin, which includes semi-crystalline and non-crystalline resin, as the aforementioned polyamide resin, as disclosed in Japanese Patent Publication Toku Kai Hei 8-157714. Also, the denatured or modified, high-density polyethylene improves the capability of the sleeve to slide, as well as improves resistance to abrasion wear of itself and the mating member, and contributes to maintaining these characteristics over a long period of time.

The high-density polyethylene before denaturing should have a molecular weight of 50,000 to 400,000, and it is even more desirable if it is 100,000 to 400,000, and even further desirable if it is 120,000 to 300,000.

Similarly, the density should be 0.90 g/cm$^3$ or greater, and even more desirable if it is 0.94 g/cm$^3$.

When the molecular weight is less than 50,000, the resistance of the manufactured sleeve to abrasion wear is insufficient, and when the molecular weight is greater than 400,000, it becomes difficult to manufacture the sleeve, which is undesirable.

Furthermore, it is desirable that the denatured or modified, high-density polyethylene be obtained by denaturing or modifying the high-density polyethylene described above with at least one of unsaturated dicarboxylic acid and unsaturated dicarboxylic acid anhydride. This denatured, high-density polyethylene should be 0.5 to 10 parts by weight with respect to the 100 parts by weight of the polyamide resin, and best when 1.0 to 5 parts by weight.

In the case of the clutch-release bearing unit of a second feature of the invention, instead of the composition described for the first feature, the sleeve is manufactured from a composition further containing, in addition to the composition of the first feature, at least 0 to 20 parts by weight of a denatured or modified olefin polymer or a denatured or modified styrene polymer or both with respect to the 100 part by weight of the composition of the first feature.

Both the denatured olefin polymer and denatured styrene polymer mentioned above improve the capability of the sleeve to slide, as well as improve its resistance to abrasion wear, and also contribute to maintaining these characteristics over a long period of time.

It is desirable that the denatured olefin polymer or denatured styrene polymer mentioned be obtained by denaturing an olefin polymer or a styrene polymer with at least unsaturated dicarboxylic acid or unsaturated dicarboxylic acid anhydride or both. When the amount of either the denatured olefin polymer and denatured styrene polymer or combination of both is greater than 20 parts by weight of the 100 parts by weight of the composition of the first feature, then the resistance to abrasion wear of the manufactured sleeve becomes insufficient, which is not desirable.

In the case of the clutch-release bearing unit of a third feature of the invention, instead of the composition described for the first feature, the sleeve is manufactured from a composition further containing, in addition to the composition of the first feature, 0 to 120 parts by weight of an inorganic reinforcement material with respect to the 100 part by weight of the composition of the first feature. This inorganic reinforcement material may be included the composition of the second feature. It is possible to use glass fiber, glass flakes or the like as this inorganic reinforcement material.

From the aspect of maintaining the sliding capability of the sleeve and its resistance to wear over a long period of time, the difference in the water contact angle with respect to the surface of the sleeve constructed using the aforementioned compositions, before and after the surface condition of the sleeve is tested for abrasion wear, should be within 15 degrees.

The abrasion test was performed using a Suzuki-type abrasion tester, an S-45V steel sample (abrasion surface area: 1.6 cm$^2$) was used as the mating member, and the tester was operated for 24 hours at an abrasion speed of 10 cm/sec, and a load of 20 kg/cm$^2$. Measurement of the aforementioned water contact angle was performed by placing one drop of distilled water on the surface of the sleeve with a syringe, and then measuring the angle of contact 30 seconds later.

With the clutch-release bearing unit of this invention constructed as described above, it is possible to improve the sliding capability of the sleeve with respect to the guide shaft as well as its resistance to abrasion wear over a long period of time. Moreover, with the clutch-release bearing unit of the third feature, by combining an inorganic reinforcement material such as glass fiber with the composition of the sleeve, it is possible to sufficiently maintain the sleeve strength.

Figure 2:
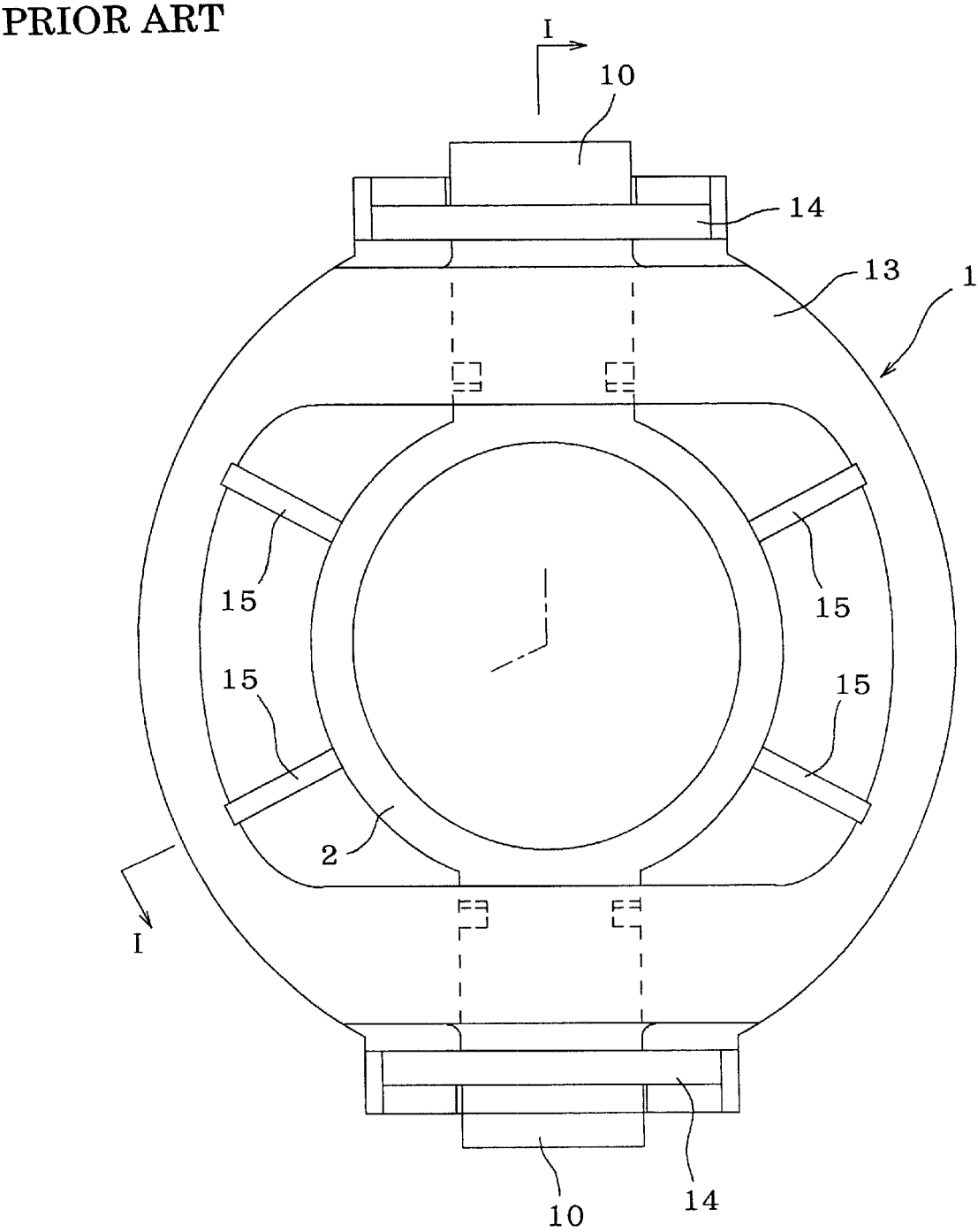
FIG. 2 is a view taken from right in FIG. 1.

The construction used in the test is shown in FIGS. 1 and 2 where a clutch-release bearing unit 1 is fitted on a guide shaft 21 in which a power transmission shaft 23 extends. The clutch-release bearing unit 1 has a sleeve 2.

The clutch-release bearing unit of this invention is characterized by the material of the sleeve 2 for improving the sliding capability of the sleeve 2 with respect to the guide shaft 21 in the clutch mechanism (see FIGS. 1 and 2) and its resistance to abrasion wear, and for maintaining these characteristics over a long period of time.

The construction of the clutch-release bearing unit shown in the figures is similar to the prior known clutch-release bearing unit shown in FIGS. 1 and 2, so any duplicate explanation is omitted here. The test for confirming the effect of this invention is described below.

A radial load was applied between the guide shaft 21 and the sleeve 2, and after the sleeve was slidingly moved in the axial direction along the guide shaft 21 and back, the amount of wear on the sliding surface of the guide shaft 21 was measured. Moreover, in order to compare the effect of this invention with that of the prior device, the measurement described above was performed for both the sleeve of this invention as well as for the prior sleeve. The following materials were used as the material for the sleeve of this invention and for the prior art sleeve.

- Material of this invention: a composition comprising Polyamide 66 (100 parts by weight) to which an inorganic reinforcement glass fiber (35 parts by weight) and denatured, high-density polyethylene (5 parts by weight) have been added.
- Prior art material: a composition comprising Polyamide 66 (100 parts by weight) to which an inorganic reinforcement glass fiber (35 parts by weight) has been added.
- The test conditions were as follows:
- Guide-shaft material: Aluminum alloy (ADC12)
- Guide-shaft rpm: 0 [rpm]
- Atmospheric temperature: 100 [° C.]
- Slide stroke: 7 [mm]
- Radial load: 5 [kgf]
- No. of sliding motions: 100,000 [times]

Figure 3:
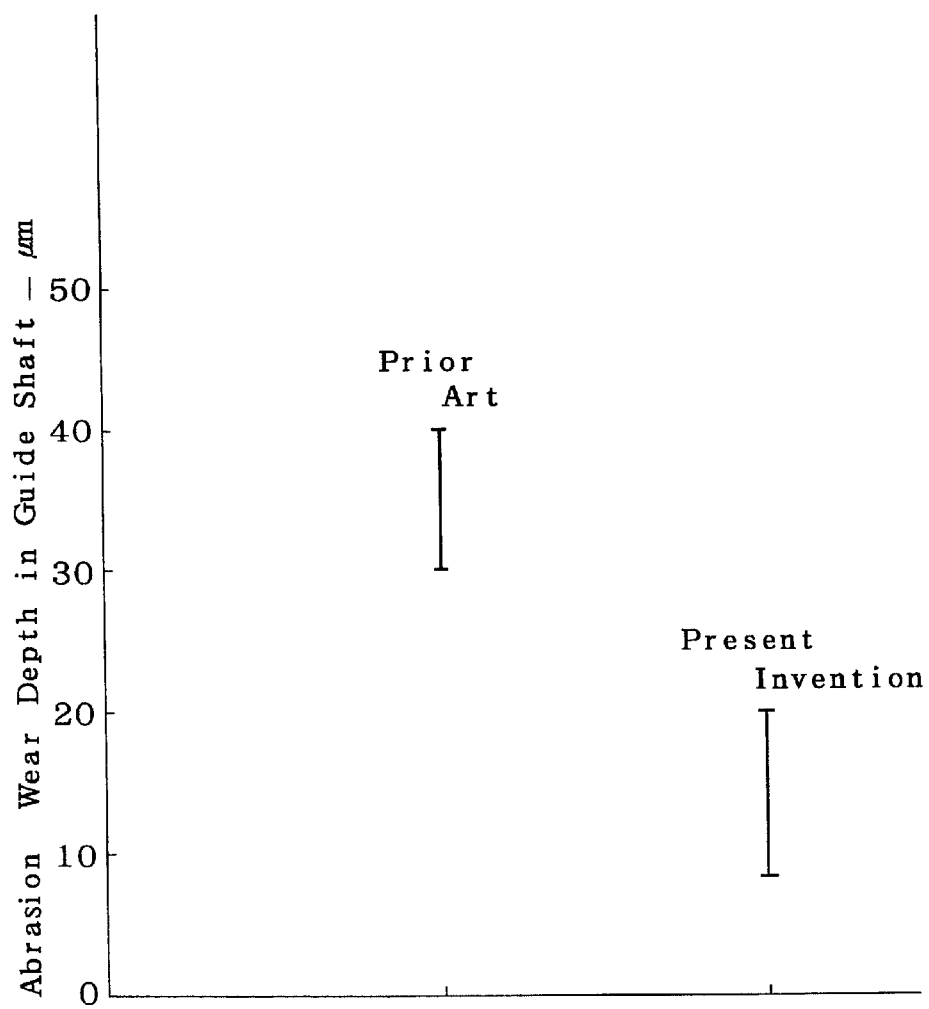
FIG. 3 is a diagram to show the results of experiment conducted to confirm the effects of the present invention.

The test results under these conditions are shown in FIG. 3.

As can be seen from FIG. 3, in the case of this invention, the amount of abrasion wear on the sliding surface of the guide shaft 21 has been reduced by nearly half when compared with that in the prior device. In addition, in this invention it is possible to maintain good sliding capability of the sleeve 2 with respect to the guide shaft 21 as well as its resistance to wear over a long period of time. As a result, it is possible to improve the durability of the clutch-release bearing unit of this invention as well as the clutch device installed in this clutch-release bearing unit.

This invention, when used as described above, makes it possible to maintain good sliding capability of the sleeve with respect to the guide shaft as well as its resistance to abrasion wear over a long period of time. As a result it is possible to make a clutch device having excellent durability.

What is claimed is:

1. A clutch release bearing unit comprising:
   a non-rotatable guide shaft made of aluminum alloy formed in a cylindrical shape, and provided around a rotatable power transmission shaft,
   a non-rotatable cylindrical sleeve provided around the guide shaft to be axially slidable along the guide shaft, and having an outer periphery,
   a circular flange fixed on the outer periphery of the sleeve,
   a bearing comprising a non-rotatable ring supported by the flange and a rotatable ring adapted to come into contact with a diaphragm spring to press the diaphragm spring, and
   a sleeve material consisting of a composition of polyamide resin and denatured, high-density polyethylene.

2. A clutch release bearing unit according to claim 1, wherein the high-density polyethylene has a molecular weight between 50,000 and 400,000 before denaturing.

3. A clutch release bearing unit comprising:
   a non-rotatable guide shaft made of aluminum alloy formed in a cylindrical shape, and provided around a rotatable power transmission shaft,
   a non-rotatable cylindrical sleeve provided around the guide shaft to be axially slidable along the guide shaft, and having an outer periphery,
   a circular flange fixed on the outer periphery of the sleeve, and
   a bearing comprising a non-rotatable ring supported by the flange and a rotatable ring adapted to come into contact with a diaphragm spring to press the diaphragm spring,
   wherein, the sleeve is made of a composition comprising a polyamide resin, denatured high-density polyethylene, and at least one of a denatured olefin copolymer and a denatured styrene copolymer.

4. A clutch release bearing unit according to claim 3, wherein the polyamide resin is 100 parts by weight of the composition and the copolymers are 0 to 20 parts by weight of the composition.

5. A clutch release bearing unit comprising:
   a non-rotatable guide shaft made of aluminum alloy formed in a cylindrical shape, and provided around a rotatable power transmission shaft,
   a non-rotatable cylindrical sleeve provided around the guide shaft to be axially slidable along the guide shaft, and having an outer periphery,
   a circular flange fixed on the outer periphery of the sleeve, and
   a bearing comprising a non-rotatable ring supported by the flange and a rotatable ring adapted to come into contact with a diaphragm spring to press the diaphragm spring,
   wherein the sleeve material is made of a composition of a polyamide resin, denatured high-density polyethylene, and an inorganic reinforcing material.

* * * * *